United States Patent
Mauldin

(10) Patent No.: US 8,057,572 B2
(45) Date of Patent: Nov. 15, 2011

(54) METAL RECOVERY

(75) Inventor: Charles H. Mauldin, Fredericksburg, TX (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 388 days.

(21) Appl. No.: 12/322,792

(22) Filed: Feb. 6, 2009

(65) Prior Publication Data

US 2009/0223325 A1 Sep. 10, 2009

Related U.S. Application Data

(60) Provisional application No. 61/068,540, filed on Mar. 7, 2008.

(51) Int. Cl.
*B01J 38/60* (2006.01)
*B22F 9/04* (2006.01)

(52) U.S. Cl. .......... 75/353; 75/370; 75/744; 502/27

(58) Field of Classification Search .......... None
See application file for complete search history.

(56) References Cited

U.S. PATENT DOCUMENTS

| | | |
|---|---|---|
| 2,227,833 A | 1/1941 | Hixson et al. |
| 3,578,395 A | 5/1971 | Kluksdahl et al. |
| 3,855,385 A * | 12/1974 | Derosset et al. .......... 556/45 |
| 6,936,090 B2 * | 8/2005 | Meese-Marktscheffel et al. .......... 75/711 |
| 2003/0119658 A1 | 6/2003 | Allison et al. |

FOREIGN PATENT DOCUMENTS

| | | |
|---|---|---|
| DE | 10 2005 061 954 A1 | 7/2007 |
| EP | 0 568 407 A1 | 11/1993 |
| FR | 2 671 104 | 7/1992 |
| WO | WO 2007/099365 A1 | 9/2007 |

OTHER PUBLICATIONS

Kurt R. Rhoads, et al., "Metal Recovery and Catalyst Reuse from the Photocatalytic Oxidation of Copper-Ethylenediaminetetraacetic Acid", *Journal of Environmental Engineering*, Apr. 2004, pp. 425-431.

V. V. Kochetkov, "Recovery of ammonium perrhenate during processing of platinum-rhenium catalysts", *Izvestiya Vysshikh Uchebnykh Zavedenii, Gornyi Zhurnal*, 1997, 11-12, pp. 241-244 (Abstract Only).

M. A. Milusheva, et al., "Extraction of molybdenum and rhenium from solutions of nitric acid-sulfuric acid leaching of molybdenite concentrates", *Kompleksnoe Ispol'zovainie Mineral'nogo Syr'ya*, 1986, 11, pp. 53-55 (Abstract Only).

* cited by examiner

*Primary Examiner* — George Wyszomierski

(57) ABSTRACT

A method is provided for recovering rhenium from a titania-supported, rhenium-containing catalyst by treating the catalyst in the reduced form with an acid in an amount and for a time sufficient to dissolve the rhenium without dissolving the support.

19 Claims, No Drawings

METAL RECOVERY

Non Provisional Application based on U.S. Ser. No. 61/068,540 filed Mar. 7, 2008.

FIELD OF THE INVENTION

The present invention relates to the recovery of catalytic metals on a solid titania support and in particular to the recovery of rhenium from titania supported Fischer-Tropsch catalysts.

BACKGROUND OF THE INVENTION

Catalysts comprising a catalytically active metal on a support such as silica or alumina are known in the art for hydrogenation reactions. For example, a catalyst comprising platinum and rhenium supported on alumina has been found to be highly effective for the reforming of naphtha. Similarly, a catalyst comprising cobalt and rhenium supported on alumina or silica has been found to be effective for the preparation of hydrocarbons from synthesis gas via the Fischer-Tropsch process. Although rhenium is an expensive metal, its excellent catalyst promoting activity justifies its commercial use.

In certain chemical reactions, it is believed to be advantageous to deposit a catalytic metal or metals on a titania support. For example, cobalt and rhenium supported on titania is preferred by some workers for Fischer-Tropsch reactions because it is more active for CO conversion than when supported on alumina or silica. Also, titania supported catalysts may be preferred for use in hydrothermal environments where alumina supports may show a tendency to degrade to some extent.

As is well known, during use catalysts tend to become less active and require periodic regeneration. Regeneration typically restores the activity of the catalyst to a level approximating its original condition; however, after many regenerations, the catalyst will no longer be capable of being restored to a satisfactory activity level. It then becomes necessary to replace the deactivated or spent catalyst with fresh catalyst.

Noble catalytic metals are expensive, and hence, the art is replete with methods for recovering them from deactivated catalysts containing them. For example, platinum can be recovered from alumina supported platinum-containing catalysts by dissolving the support with strong acidic or strong basic solutions. Similarly, rhenium can be recovered from alumina supported rhenium-containing catalyst by digestion of the support with an acid or base followed by filtration to isolate the rhenium-containing catalytic metal. This approach is not feasible with titania-supported catalysts because titania is not completely soluble in acid or base.

An object of the present invention is to provide a method for the recovery of rhenium from titania-supported catalysts and especially the recovery of cobalt and rhenium from titania-supported cobalt and rhenium catalysts.

SUMMARY OF THE INVENTION

Accordingly, the present invention provides a method for recovering rhenium from a titania-supported rhenium-containing catalyst, such as a rhenium-promoted cobalt catalyst, the method comprising treating the catalyst in the reduced form with an acid in an amount and for a time sufficient to dissolve the rhenium without dissolving the support.

In one embodiment of the invention, cobalt and rhenium metals are recovered from a titania-supported cobalt and rhenium-promoted metal catalyst by treating the catalyst in its reduced form with an acid in an amount and for a time sufficient to dissolve the catalytic metals and thereafter separating the dissolved metals from the undissolved support.

Other embodiments of the invention will become apparent from the description which follows.

DETAILED DESCRIPTION OF THE INVENTION

The present invention is applicable to catalysts containing rhenium supported on a titania catalyst support. Such rhenium-containing catalyst is used broadly herein to include rhenium and also rhenium combined with other catalytic metals such as Group VII noble metals, for example, platinum, palladium, rhodium, osmium, iridium and ruthenium; and non-noble metals, such as, cobalt, nickel, and iron.

The present invention is particularly applicable to titania-supported cobalt and rhenium catalysts such as those used in the Fischer-Tropsch hydrocarbon synthesis process. Therefore, for convenience, the present invention will be described by specific reference to titania-supported cobalt and rhenium catalysts.

As a practical matter, the catalyst treated according to the invention normally will be a used catalyst that has become at least partially spent or deactivated. However, rhenium can be recovered from fresh catalyst as well by the process of the invention.

In the method of the present invention, it is necessary that rhenium, and other catalytic metals when present, on the titania-supported catalyst be in the reduced state prior to treatment according to the invention. If the rhenium and any other metals are not in the reduced state, they can be converted to the reduced state by contacting the rhenium-containing catalyst with a reducing atmosphere, for example, a hydrogen-containing atmosphere, at a temperature and pressure, and for a time sufficient to convert the rhenium to the reduced state. For example, a slurry of spent, rhenium-containing, titania-supported catalyst in liquid hydrocarbons, such as those produced in a Fischer-Tropsch hydrocarbon synthesis process, is separated from the hydrocarbons in a catalyst separation zone. The separated catalyst then is contacted with hydrogen or a mixture of hydrogen and an inert gas at temperatures in the range of about 250° C. to about 550° C., preferably from about 275° C. to about 425° C., and pressures ranging from above ambient to about 40 atm for a time sufficient to reduce the rhenium. Typically about 30 minutes to about 24 hours is sufficient to reduce the rhenium.

Alternatively, a slurry of spent, rhenium-containing, titania-supported catalyst in the liquid hydrocarbons may be reduced in the presence of the liquid hydrocarbons by contacting the slurry with $H_2$ and CO in the molar ratio of about 1.5 to 4.0 at pressures of 1 to about 100 atm and preferably 10 to 25 atm at temperatures of 175° C. to 450° C. and preferably 175° C. to 300° C. for a time sufficient to reduce the rhenium. Then the reduced catalyst is separated from the liquid hydrocarbons for treatment according to the invention.

The titania-supported catalyst comprising rhenium in the reduced state, and optionally, cobalt, also in the reduced state, is treated with sufficient acid to dissolve the rhenium, and also the cobalt if present, in the catalyst. In general, the acid used will be a strong acid, such as, sulfuric acid, hydrochloric acid, aqua regia and nitric acid. Preferably, the acid used will be nitric acid.

The amount of acidic solution used will be sufficient to at least cover the catalyst and preferably will comprise a volume greater than the volume of the catalyst, for example, about 1 to about 100 times the volume of the catalyst being treated. The amount of acid present in the solution must be greater than the amount required to react and dissolve the metals present on the catalyst. In the case of Fischer-Tropsch catalysts, there is much more cobalt on the catalyst, on a molar basis, than rhenium, so the minimum amount of acid required may be estimated to be at least two moles of acid per mole of cobalt. An excess amount of acid is preferred to ensure rapid, complete dissolution of the metal(s). More preferably, nitric acid is used, and the molarity of the nitric acid may range from about 0.1 to 15M, preferably from about 0.5 to 2M, most preferably from about 0.75 to 1M.

Optionally, the catalyst may be treated successively with the acid.

The treating of the catalyst may be performed at temperatures in the range of ambient to the boiling point of the acid solution, depending on acid concentration.

Optionally, during treating of the catalyst, the solution may be purged with air at any suitable flow rate, such as from about 5 to about 200 cc/min and, typically, about 100 cc/min.

The acid solution containing rhenium and optionally cobalt is readily separated from the titania support by filtration. Thereafter, the resulting metal solution may be processed in order to make it suitable for use in catalyst preparation or to separate and recover the dissolved metals. For example, the solution may be concentrated by evaporation or distillation and used directly in the preparation of titania-supported rhenium catalysts or cobalt and rhenium catalysts. Optionally, the solution may be spray dried in order to recover the rhenium salt or a mixture of cobalt and rhenium salts when cobalt is present.

Should separation and recovery of the cobalt and rhenium be desired, the solution may be subjected to electrolysis to plate out rhenium, for example, thereby separating it from the cobaltous ions. Optionally, the solution may be passed through an appropriate ion exchange resin to effect separation of the cobalt and rhenium. The cobaltous component may also be precipitated, with ammonium carbonate or a base like sodium hydroxide, and removed by filtration to provide a predominately rhenium-rich solution. Rhenium oxide may also be recovered by high temperature roasting of the cobalt-rhenium oxide mixture obtained by drying the solution.

The method of the invention is illustrated by reference to the following example.

EXAMPLE

A series of runs were conducted in which a 5-gram portion of a rutile titania-supported cobalt and rhenium-containing catalyst was treated with one of three solvents listed in the following Table. The catalyst was prepared as follows. A slurry of 34.4 parts (by weight) of fumed $TiO_2$, 8.8 parts alumina chlorhydrol sol (containing 23.5 wt % $Al_2O_3$), 0.6 parts silica sol (35 wt 5 $SiO_2$) and 56.2 parts water was spray dried at a rate of about 13 lb/minute through a 9-inch wheel atomizer spinning at 10,000 rpm. The spray drying chamber was operated at an inlet air temperature of about 285° C. and an outlet temperature of about 120° C. The spray dried support was calcined in a rotary calciner at 1010° C. The support was impregnated with an aqueous solution of cobalt nitrate and perrhenic acid and calcined in air at 454° C. A second impregnation and calcination was applied to produce a final catalyst containing 10.58% Co and 1.20% Re. A portion of this catalyst was reduced in hydrogen at 375° C., 1 atm, for 1 hour. For metals recovery tests, the reduced catalyst was transferred into the treating solution under argon.

In one set of runs, the catalyst was in the reduced state in accordance with the method of the invention. In a comparative set of runs, the catalyst was in the oxidized state.

The 5-gram portion of catalyst was added to 50 ml of solvent and allowed to stand, with a continuous purge of flowing air and occasional swirling, for 30 minutes. The mixture was filtered, and the filtrate was increased to 500 ml volume with de-ionized water. The recovered catalyst was dried in a vac oven and analyzed for residual cobalt and rhenium by X-ray fluorescence. The diluted filtrate was analyzed for cobalt and rhenium by inductively coupled plasma emission spectroscopy analysis.

The results are shown in the Table below.

TABLE

| Catalyst | Run No. | Solvent | Metals on catalyst | | Metals in solution | |
|---|---|---|---|---|---|---|
| | | | Wt % Co | Wt % Re | ppm Co | ppm Re |
| Before extraction | | — | 10.58 | 1.20 | — | — |
| After extraction of oxide catalyst | 1 | $H_2O$ | 10.85 | 0.83 | 8 | 16 |
| | 2 | 1M $HNO_3$ | 10.24 | 0.70 | 79 | 33 |
| | 3 | 1M $NH_4OH$ | 10.97 | 0.88 | 2 | 15 |
| After extraction of reduced Catalyst | 4 | $H_2O$ | 10.66 | 1.01 | 1 | <1 |
| | 5 | 1M $HNO_3$ | <0.01 | 0.15 | 1014 | 78 |
| | 6 | 1M $NH_4OH$ | 10.31 | 1.01 | 4 | 2 |

As can be seen, Run 5, the example of this invention, is the only treatment resulting in appreciable metal extraction. This treatment of the reduced form of the catalyst with acid produced a recovered solid with undetectable residual cobalt and low rhenium. The extracted metals were present in the diluted filtrate to a much greater extent compared to the other treatments.

What is claimed is:

1. A method for recovering rhenium from a titania-supported rhenium-containing catalyst comprising:
   treating the catalyst, comprising rhenium in an unoxidized form, with an acid in an amount and for a time sufficient to dissolve the rhenium without dissolving the support.

2. The method of claim 1 including separating the dissolved rhenium from the support.

3. The method of claim 2 wherein the acid is selected from the group consisting of sulfuric acid, hydrochloric acid, aqua regia, and nitric acid.

4. The method of claim 3 wherein the acid has a concentration sufficient to dissolve the rhenium.

5. The method of claim 4 including purging the acid with air during the treating step.

6. The method of claim 4 or 5 wherein the acid is nitric acid.

7. The method of claim 6 wherein the nitric acid has a molarity in the range of about 0.1 to about 15.

8. A method of recovering cobalt and rhenium from a titania-supported cobalt and rhenium-containing catalyst, the method comprising:

treating the catalyst, comprising rhenium in an unoxidized state, with an acid in an amount and for a time sufficient to dissolve cobalt and rhenium without dissolving titania; and thereafter separating the dissolved cobalt and rhenium from the support.

9. The method of claim 8 wherein the acid is selected from the group consisting of sulfuric acid, hydrochloric acid, acqua regia and nitric acid, having a molarity sufficient to dissolve the cobalt and rhenium, wherein the acid is used in an amount sufficient to at least cover the catalyst.

10. The method of claim 9 wherein the acid is nitric acid.

11. The method of claim 10 wherein the nitric acid has a molarity in the range of about 0.1 to about 15.

12. The method of claim 11 including the step of processing the dissolved cobalt and rhenium to make it suitable for use in catalyst preparation.

13. The method of claim 11 including processing the dissolved cobalt and rhenium to separate them.

14. The method of claim 13 wherein said processing comprises one of subjecting the solution to electrolysis to effect separation and subjecting the solution to ion exchange to effect separation.

15. A method for recovering rhenium from a titania-supported rhenium-containing catalyst in which the rhenium is in an oxidized state, the method comprising:
reducing the catalyst to put the rhenium in the reduced state;
treating the catalyst with rhenium in the reduced state with an acid in an amount and for a time sufficient to dissolve the rhenium without dissolving the titania; and
separating the dissolved rhenium from the titania.

16. A method for recovering rhenium from a spent, titania-supported, rhenium-containing catalyst slurried in liquid hydrocarbons, the method comprising:
contacting the slurried catalyst with a reducing gas comprising $H_2$ and CO in the molar rates of about 1.5 to 4.0 at a pressure of from 1 to 100 atm and a temperature of 175° C. to 450° C. for a time sufficient to reduce the rhenium in the catalyst,
separating the reduced catalyst from the liquid hydrocarbons;
treating the separated catalyst with an acid selected from sulfuric acid, hydrochloric acid, aqua regia and nitric acid in an amount and for a time sufficient to dissolve the rhenium without dissolving the titania; and
separating the dissolved rhenium from the titania.

17. The method of claim 16 wherein the acid is nitric acid having a molarity of about 0.1 to about 15.

18. A method for recovering rhenium from a spent, titania-supported rhenium-promoted cobalt catalyst slurried in liquid hydrocarbons, the method comprising;
separating the catalyst from the liquid hydrocarbons in a separation zone;
contacting the separated catalyst with a reducing gas selected from hydrogen and a mixture of hydrogen and an inert gas, at a temperature in the range of about 250° C. to about 550° C. and at a pressure from about ambient to about 40 atm for a time sufficient to convert the rhenium to the reduced state;
treating the reduced rhenium with an acid selected from sulfuric acid, hydrochloric acid, aqua regia and nitric acid in an amount and for a time sufficient to dissolve the cobalt and rhenium without dissolving the titania; and
separating the dissolved cobalt and rhenium from the titania.

19. The method of claim 18 wherein the acid is nitric acid having a molarity of about 0.1 to about 15.

\* \* \* \* \*